(No Model.)
D. TORREY.
CAR BRAKE.
No. 263,997. Patented Sept. 5, 1882.
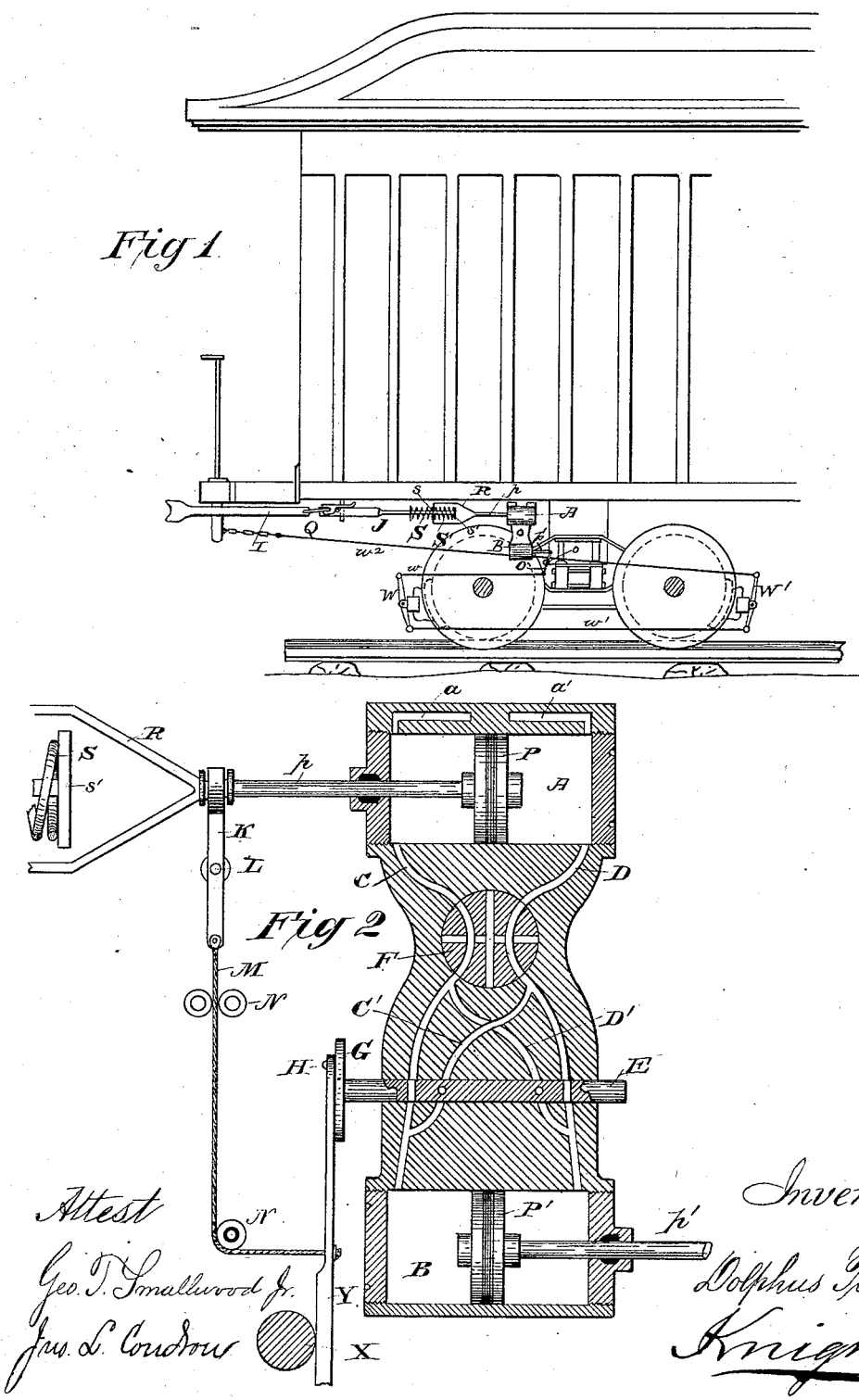

UNITED STATES PATENT OFFICE.

DOLPHUS TORREY, OF NEW YORK, N. Y., ASSIGNOR TO THE TORREY AUTOMATIC BRAKE COMPANY, OF SAME PLACE.

CAR-BRAKE.

SPECIFICATION forming part of Letters Patent No. 263,997, dated September 5, 1882.

Application filed October 11, 1881. (No model.)

*To all whom it may concern:*

Be it known that I, DOLPHUS TORREY, a citizen of the United States, residing in the city, county, and State of New York, have invented Improvements in Automatic Car-Brakes, of which the following is a specification.

The invention relates to mechanism to effect the application of the brakes of a railroad-car by means of the draw-bar or its equivalent. Heretofore such brakes have been made by a combination of levers, arms, pawls, toggle-joints, and various combinations of like mechanical elements, often depending upon a considerable rate of speed to be operative, and often liable to get out of order and require repairs.

The object of my invention is to provide a brake that will act at any rate of speed, and by the use and combination of mechanical elements that will be less liable to get out of order than those referred to.

The invention consists of two hydraulic cylinders, to one of which the draw-bar and to the other the brake-rod are connected by means of piston-rods. Between the heads of these pistons are two water-rods, which cross each other between the cylinders and have branch lines leading to cocks or valves. A double two-way cock is placed so as to control the flow of the contained fluid between the cylinders, and named the "automatic cock." In one position of this cock the lines of communication between the cylinders cross each other, while in the other they are parallel. A second cock, placed between the first-named and one of the cylinders having four ways, so as to change the lines from cross to parallel ones, has a hand adjustment, by which the apparatus is disconnected or adjusted for service with the car running in either direction, as the engine may be attached to the train, and is called the "direction-cock." The cylinders and connecting-passages are filled with a liquid—say glycerine—permitting the retention in the motor-cylinder of a small volume of air to occupy the air-chamber, the purpose being to have conditions for resisting the percussive shock which the apparatus may receive in the rough handling of the car.

In the accompanying drawings, Figure 1 is a side elevation of one end of a car with the brake mechanism applied. Fig. 2 is a longitudinal section of the principal working parts of my invention on a larger scale.

A is the draw-bar cylinder or motor-cylinder, the piston-rod of which is connected with the draw-bar of the car.

B is the brake or operative cylinder, the piston-rod of which is connected with the brake-rod of car. This rod is supposed to be attached to the arm of a lever, so that when the piston is drawn in the brake is applied. C and D are passages for the water-rods, connecting the ends of the two cylinders one with the other. As shown in Fig. 2, the lines of the two rods are parallel.

C' and D' are branch passages, which, when open, connect the two cylinders by their opposite ends.

E is the automatic cock, through which pass the parallel and cross lines of the water-rods, but only one set of lines at the same time.

F is the direction-cock, through which pass both parallel lines, as shown open in the figure, and also cross-lines, as shown cut off. By turning the cock F one-eighth of a revolution to the left the cross-lines will be in connection, and by turning it one-eighth of a revolution farther the parallel lines will be connected, so as to unite the ends of each cylinder together and sever all connection of one cylinder with the other. By turning cock E one-fourth of a revolution the parallel lines will be disconnected and the cross-lines will be connected.

At the end of cock E is a crank disk or arm, G, to which is attached the end of a friction-bar, Y, by the rise and fall of which the cock E is rotated in its seat. The friction-bar Y is applied to the axle X of the car for the power to change its position.

K is a lever fulcrumed at L. At one end it is attached directly or indirectly to the draw-bar, so as to be swung by any change in position of the draw-bar. At its lower end it is connected with a chain, M, that passes between the guide-pulleys N and around the pulley N to the friction-bar Y. When the lever K swings in either direction the chain M will be drawn up, and thereby its tension on the bar Y will be increased, which will, by the friction of the axle X when in rotation, cause the bar to shift its position in the direction of wheel rotation, if not already at the limit of its permitted movement, and through its connection H with the wheel or arm G rotate the cock E on its seat.

The cylinders A and B may be formed on the extremities of a single casting, at the upper end of which are chambers $a$ $a'$, connecting with the respective ends of the cylinder A, and containing air for cushioning the liquid contents of said cylinder. The cylinder-heads may be screwed in or otherwise secured in the customary manner. Within the casting are formed the passages C and D and crossed passages C' D', for the water-rods hereinbefore referred to.

The draw-bar is shown at I connected through a link, Q, with a pull-rod, J, which actuates the piston-rod $p$ through the medium of springs S S' confined between collars $s$ $s'$ on the rod J, and bearing in both directions against the head of a yoke, R, attached to the piston-rod $p$. When the stress put on the draw-bar is in excess of the resisting power of the springs S S' the yielding of the said springs relieves the brake apparatus from such excess, thus limiting the stress which the brake apparatus may receive.

I do not limit myself to the use of metallic or gum or other analogous springs in the limitation device, as I also contemplate the use of hydraulic and pneumatic springs, answering functionally the same purpose.

The apparatus is attached to the body of the car between the draw-bar and bolster and between the central stringers and draw-bar timbers.

To illustrate a suitable mode of connecting the piston P' with the brake, I have shown in Fig. 1 the piston-rod $p'$ connected to a lever, O, which is fulcrumed at $o$ and connected by its lower end, $o'$, to the brake-rod $w$, the customary brake-levers being shown at W W', connected at their lower ends by a rod, $w'$, while from the upper end of the lever W' a rod and chain, $w^2$, connect with the hand-brake staff, which thus affords a fulcrum-point for the system.

In describing the operation of this apparatus it is assumed that the engine is attached to the train in the direction of the left end of the car, and that the parts of the machine are in position shown in Fig. 2. When the engine pulls, the piston P in cylinder A moves to the left, displacing the liquid contents through the passage C into cylinder B, forcing the piston P' in cylinder B to move to the right, displacing the liquid in the right end of B through the passage D into the cylinder A. Should the engine resist the forward motion of the car the flow of the liquid would be in a direction the reverse of that described, and by the drawing in of the piston P' would apply the brakes. Should this resisting motion be continued until the car stops, and, further, until the car runs backward or to the right, the change of direction of movement by the car will change also the direction of the wheel rotation. The movement of the draw-bar will move the lever K, which will draw the chain M, and thereby apply the friction-bar Y against the axle X, thus causing the bar to pull down and rotate the cock E, so as to disconnect the pipes D and C and to connect C' and D', thus making the connection between the cylinders by cross lines instead of by parallel ones. In this position the flow of liquid from the cylinder A will be to the left end of B and throw off the brakes. This condition of "off" brakes will continue while the backing movement of the car is continued. Should the engine resist this backing movement by slowing, the action will extend the draw-bar, thereby forcing the flow of liquid from A to the right end of B, and thus put on the brakes. If this action of the engine be continued until it causes a change in direction of the car's motion, the movement of the draw-bar will, as before described, apply the friction-bar to the axle, which will, by the change of rotation in wheels and axles, raise the bar, shift the cock E, and replace the arrangement of C and D, as first described.

In attaching an engine to the right end of the car we have a reversal of conditions, as the wheels rotating to the right shift the cock E to cross lines, in which condition the extension of the draw-bar will apply the brakes, as should not be the case; but by setting cock F to cross lines we get by the duplication of cross lines parallel lines, on which condition the brakes' apparatus will meet all requirements of pulling and backing precisely as was the case when the engine was at the left end of the car, and as described. When a train is made up a person, by means of a rod or shaft connecting it with a handle at the side of the car, sets the direction-cock to cross lines for running to the right and to parallel lines for running to the left, and to a designated place to disconnect the apparatus, if desired, by making an independent circuit for each cylinder. The automatic cock is shifted by a bar having frictional contact with the axle so adjusted that when the wheels rotate to the left the lines of water-rods are parallel and when the wheels rotate to the right the lines are crosswise. When both cocks are set with crossed lines, and when both are set with parallel lines, the resulting connection is by parallel lines. When either of the cocks is with crossed lines and the other is parallel the resulting connection is by crossed lines.

Having thus described my invention, what I claim as new therein, and desire to secure by Letters Patent, is—

1. In an automatic draw-bar brake, the combination of a cylinder containing a piston attached to the draw-bar, a second cylinder containing a piston connected with the brake system, and double-acting water-rods for transmitting motion from one piston to the other, substantially as set forth.

2. In an automatic draw-bar brake mechanism transmitting motion by hydraulic pressure, the combination of a motor-cylinder and an operative cylinder with connecting-pipes branched so that by shifting cocks or valves the water-rods connect corresponding or opposite ends of said cylinders.

3. In an automatic draw-bar brake mechanism transmitting motion by hydraulic pressure, the cylinders A B and connections C C' D D', and a direction cock or valve for changing the lines of water-rods to effect the adjustment of the apparatus for the intended attachment of the engine to the train of cars.

4. In an automatic draw-bar brake mechanism transmitting motion by hydraulic pressure, the cylinders A B and connections C C' D D', and a cock or valve operated automatically for altering the lines of water-rods, so that they shall act upon the operating-piston in one direction, while the pressure on the motor-piston may be in either direction.

5. In a draw-bar brake, the combination of hydraulic cylinders A B, connections C C' D D', and an adjustment cock, E, reversed automatically by a friction-bar applied to the axle, so as to cause a motion of the draw-bar in either direction to apply the brakes.

6. In an automatic draw-bar brake, hydraulic connections between the draw-bar and the brake chain or lever, and a reversing cock or valve operated by connection with the wheel or axle, so as to determine by the direction of wheel rotation the direction of draw-bar movement which shall apply the brakes.

7. In an automatic hydraulic draw-bar brake, the combination of the friction-bar Y, cock E, water-rods C C' D D', and cylinders A and B.

8. In an automatic hydraulic draw-bar brake, the combination of the friction-bar Y, cocks E and F, water-rods C C' and D D', and cylinders A and B.

DOLPHUS TORREY.

Witnesses:
OCTAVIUS KNIGHT,
GEO. T. SMALLWOOD, Jr.